Jan. 6, 1959   A. J. NERAD ET AL   2,867,267
COMBUSTION CHAMBER
Filed Feb. 23, 1954   2 Sheets-Sheet 1
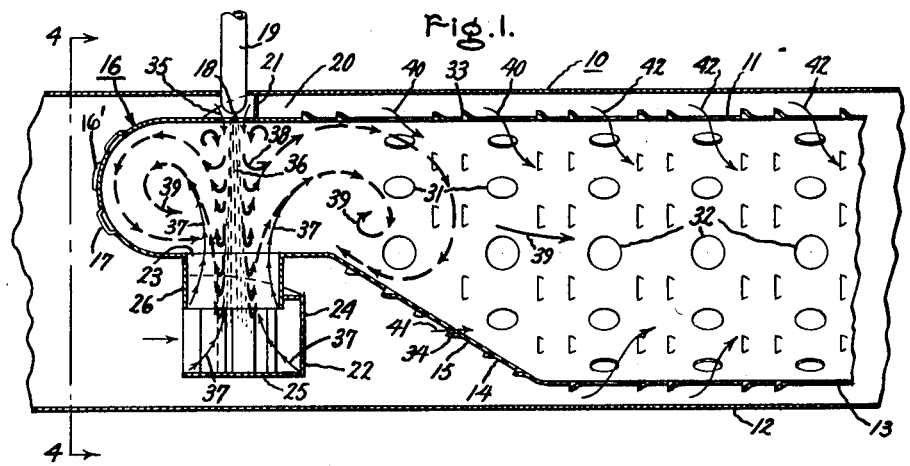
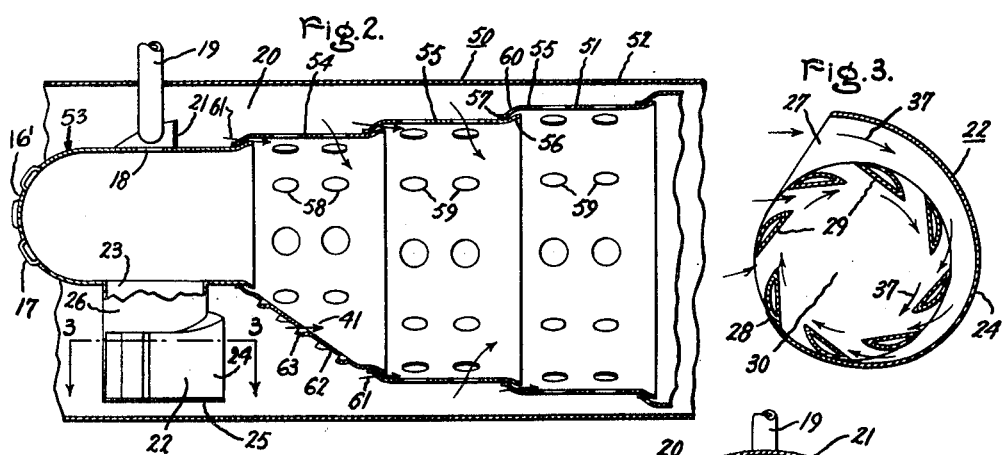
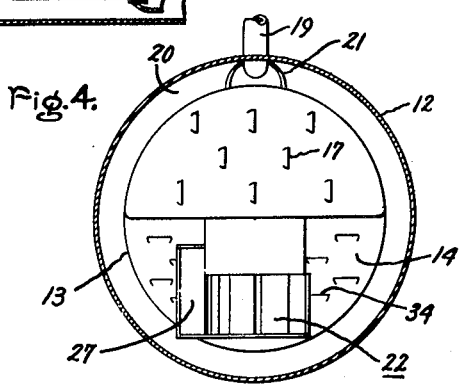
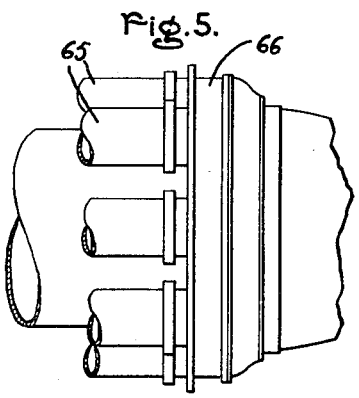
Inventors:
Anthony J. Nerad,
Robert H. Johnson,
by Paul A. Frank
Their Attorney.

Jan. 6, 1959  A. J. NERAD ET AL  2,867,267
COMBUSTION CHAMBER
Filed Feb. 23, 1954  2 Sheets-Sheet 2
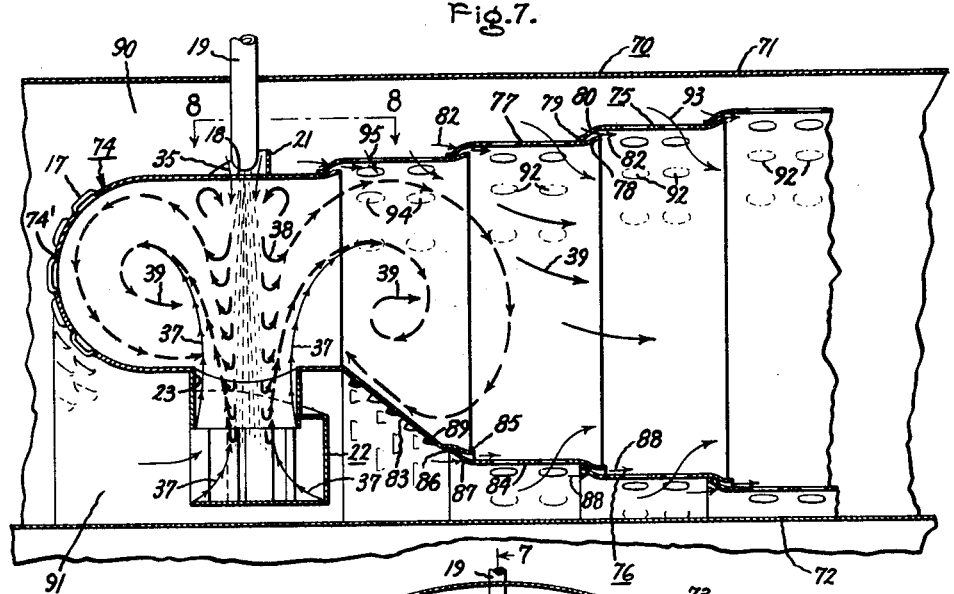
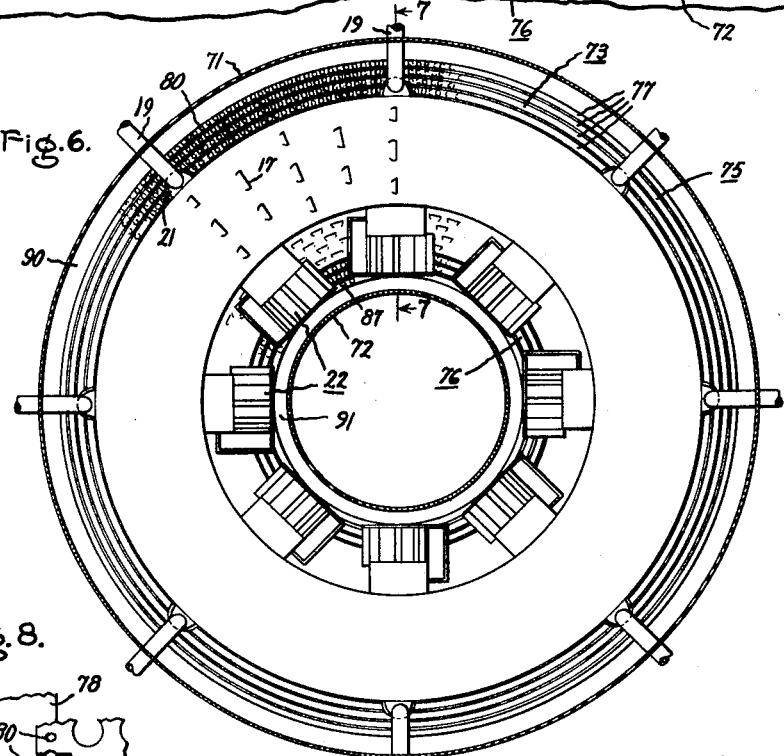
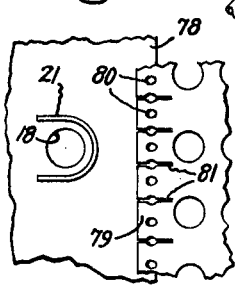
Inventors:
Anthony J. Nerad,
Robert H. Johnson,
by Paul A. Frank
Their Attorney.

United States Patent Office 2,867,267
Patented Jan. 6, 1959

2,867,267

COMBUSTION CHAMBER

Anthony J. Nerad, Alplaus, and Robert H. Johnson, Schenectady, N. Y., assignors to General Electric Company, a corporation of New York Application February 23, 1954, Serial No. 411,864

4 Claims. (Cl. 158—1)

This invention relates to combustion or reaction chambers and specifically to those utilizable as prime movers in gas turbine power plants, for the jet propulsion of aircraft, and in commercial oil and gas burners.

Combustion chambers capable of releasing large amounts of energy per unit volume are desirable in the gas turbine cycle and for small domestic or commercial fuel burners, i. e., combustors with high space rates. It is desirable that a combustion chamber be capable of providing complete burning of the fuel over a wide range of varying fuel rates and combustion chamber pressures. Complete combustion, together with an efficient mixing and diluting process, is necessary so that a uniform temperature distribution is provided at the downstream portion. The combustion chamber must have a wide tolerance to the fuels used whereby it burns the fuel completely free of carbon formation. The resulting flame must be very stable so that the reaction will not be extinguished. It has been recognized that vortices, both weak and strong, provide a relatively stable flame. Such a vortex has been generally used with its axis in the direction of the main flow. When a vortex is used in a gas turbine combustor it becomes difficult to obtain a uniform temperature pattern in the gases leaving the combustor because of the action of the vortex in concentrating the hotter gases and because of the difficulty in properly adding secondary air.

Accordingly, it is an object of our invention to provide a new and improved structure for use as a combustion chamber.

It is another object of the invention to provide an improved combustion chamber which is capable of very rapid changes in the rate of heat release without serious disturbance to the combustion process.

It is another object of the invention to provide an improved combustion chamber having transversely arranged vortical primary air admittance for facilitating the addition of supplementary air to the chamber.

It is another object of the invention to obtain a higher space rate of combustion while maintaining the combustion chamber wall surfaces relatively cool.

It is another object of the invention to provide an improved combustion chamber requiring a smaler axial length for the burning of a given amount of fuel.

It is another object of the invention to provide an improved combustion chamber permitting the use of fuel nozzles of simple design and coarser tolerances.

It is another object of the invention to provide an improved combustion chamber having fewer fuel nozzles.

It is another object of the invention to provide an improved combustion chamber which is less sensitive to the non-uniformity and the change in the non-uniformity of inlet velocity distribution.

It is another object of the invention to obtain a uniform temperature of the combustion products leaving the combustion chamber.

It is a further object of the invention to provide a combustion chamber capable of effecting ready ignition and efficient combustion over a wide range of fuels, combustion space pressures, fuel and air flows, and fuel and air inlet temperatures, as is required in thermal power plants for high altitude aircraft.

In one aspect, the objects of our invention may be realized by the injection of a fuel-air mixture into the hollow core of an opposed vortical air flow, the axis of which is at right angles to the principal combustor axis, to improve combustion thereof and to lengthen the heating and reaction path of the fuel and air. Thus, a very stable primary combustion region results which is capable of holding the flame over a wide range of operating conditions.

These and various other objects, features and advantages of the invention will be better understood from the following description taken in connection with the accompanying drawings in which:

Fig. 1 is a longitudinal cross section of an embodiment of our invention applied to a combustion chamber structure;

Fig. 2 is a longitudinal cross section of a modified combustion chamber structure;

Fig. 3 is a partial transverse section taken along line 3—3 of Fig. 2;

Fig. 4 is a vertical cross section taken along line 4—4 of Fig. 1;

Fig. 5 is a diagrammatic view of a plurality of combustion chambers as shown in Figs. 1 and 2 which are arranged in a thermal power plant such as a gas turbine;

Fig. 6 is a vertical cross section of a modified combustion chamber structure;

Fig. 7 is a longitudinal cross section taken along line 7—7 of Fig. 6.

Fig. 8 is a partially developed view of the liner taken along line 8—8 of Fig. 7; and Fig. 9 is a perspective view of the deflecting members shown in Figs. 1, 2, 4, 6 and 7.

In Fig. 1 of the drawings, a combustion or reaction chamber, which can be used in gas turbine construction or where large quantities of heated air are required to be obtained from the burning of fuel and which is indicated generally at 10, comprises two generally coaxial walls, namely, an inner wall or liner 11 and an outer wall or casing 12 held in spaced relation to each other by suitable attaching means, such as, for example, by a number of circumferentially spaced axially extending fins (not shown) which may be welded or otherwise fixed to either one or both of the walls 11 and 12. Casing 12 is generally adapted for the flow of air therethrough, for example, in gas turbines, to receive air from the compressor section for delivery to the turbine, and liner 11 is positioned therein. The liner 11 may take the form of a generally cylindrical body portion 13 open at the downstream or exhaust end which defines an air cooling and diluting zone therein. The liner 11 has a narrower intermediate body portion 14 adjacent to and forming a continuation of the body portion 13. The body portion 14 is partially tapered away from the body portion 13 as indicated by surface 15. A portion of the primary air combustion and air cooling zone is defined by the body portion 14. A narrow upstream closed end section 16 is continuous with the intermediate tapered body portion 14 and surface 15 to define the remaining portion of the primary air combustion zone therein. A series of louvers 17 are provided on the arcuate enclosing end 16' of the section 16 for furnishing cooling air to the end wall thereby preventing the formation of carbon deposits thereon.

A burner assembly associated with the closed end section 16 is provided with an inlet aperture 18 centrally disposed on the upper surface of the closed end section 16, as viewed in Fig. 1, for the admission of fuel and some of the primary air. A fuel nozzle 19 is mounted in the upper surface of the outer wall 12 and projects therethrough to be in axial alignment with the inlet opening 18 and spaced therefrom. If desired, the fuel nozzle 19 may project through the inlet opening 18 thereby providing only fuel admission. The fuel nozzle 19 may take the form of a spray nozzle which will give a finely divided spray of fuel from a fuel supplying means, such as a fuel pump (not shown). The space between the walls 11 and 12 forms a passage 20 to which air is supplied at a suitable pressure from an appropriate source (not shown) at the left or upstream end of the combustion chamber, as viewed in Fig. 1, at whatever pressure is found desirable. A flow deflecting member 21, as best shown in Fig. 9, is mounted around the inlet opening 18.

An air vortex nozzle 22 is mounted on the side wall of the closed end section 16 opposite that of the fuel inlet nozzle 19. The nozzle 22 communicates with the primary air combustion zone through an enlarged aperture 23 disposed on the opposite surface of the closed end section 16 from the aperture 18 and in axial alignment therewith. The vortex nozzle 22 comprises a throat portion 26 adjacent to and communicating with the interior of liner 11 and a next adjacent generally involute body portion 24 having a closed bottom portion 25. The body portion 24 is provided with an open end or air scoop 27, as best seen in Figs. 3 and 4, which faces the direction of flow of air into the passage 20. The body portion 24 decreases in diameter from its open end 27 to its closed end 28. A series of upstanding turning vanes 29, which may be hollow, are mounted in the vortex air nozzle 22 in any suitable manner, such as, for example, by upstanding struts (not shown) extending through the hollow chamber of each of the vanes 29. The vanes 29 are turned or directed toward the center or core 30 of the nozzle 22.

In the body portion 14 of the liner 11, there are a plurality of circumferentially spaced axially extending rows of holes 31 through which additional primary combustion air passes from the passage 20 to the axially elongated space defined by the body portion 14. In the present instance, two longitudinal rows of holes are illustrated and are shown as equally spaced circumferentially. A plurality of circumferentially spaced axially extending rows of holes 32, similar to the holes 31, are provided in the body portion 13 for the admission of supplementary combustion air and diluting air. It will be seen that the axial rows of holes 31 and 32 are arranged so that the centers of corresponding holes in the respective rows are in a common plane normal to the axis of the chamber. Louvers or slots 33 are provided in the body portions 13 and 14 for the admission of cooling air.

Louvers or slots 34 may be provided on the tapered surface 15 of the intermediate body portion 14 to admit additional cooling air to the liner 11. The wall of the surface 15 may be stamped outwardly to provide the louvers or slots 34 which face in the direction of the closed head portion 16.

In operation, a small part of the air flow entering the passage 20 is deflected by the deflecting member 21 and enters the aperture 18 provided on the upper surface of the closed end section 16. A stream of air indicated by the arrows 35 is injected into the primary air combustion or burning zone as partially defined by the closed end section 16. An atomized fuel spray 36, which also enters through the aperture 18, is directed into the center of the air stream 35. An additional stream of primary air indicated generally by the arrows 37, is tangentially admitted from the passage 20 to the air vortex nozzle 22 through the scoop or open end 27 thereof. This tangential admission of air causes a high velocity vortex flow in the nozzle 22. The air stream 37 travels along the tapered passage of the involute 24 of the air nozzle 22 and enters the interior of the nozzle through nozzle openings provided between the hollow turning vanes 29 at a velocity corresponding to the pressure drop across 27. The vortical admission of primary air provides a hollow core 30 within the vortical air flow as indicated by the arrows 37. The mixture of the air 35 and fuel 36 is then pointed into the hollow core of the air vortex nozzle 22. The fuel stream 36 is vortically entrained by the primary air flow 37 from the nozzle 22 and is bent back on itself as indicated by the arrows 38. The combustion proceeds during, and shortly after, this back flow process. This flow pattern results in a transfer of thermal energy from the burning products to the fuel which is necessary for stable combustion. The tapered surface 15 of the intermediate body portion 14 assists in holding part of the combustion flame in its toroidal pattern. The combustion gases flow toward the downstream portion as indicated by the arrows 39. The vortex action lengthens the path of the burning products, thereby requiring a smaller axial length for the burning of a given amount of fuel.

Additional primary combustion air is provided by the holes 31 and cooling air is provided by the louvers or slots 34, shown by the arrows 40 and 41, respectively. The remainder of the air necessary to dilute the product to the desired temperature, as indicated by the arrows 42, is provided by the holes 32 in the body portion 13 of the liner 11 in the conventional manner. The outer wall 12 and the liner 11 are also cooled by the air flow through the passage 20.

The fuel injection system need not be as critical as is necessary in most combustion systems because the entrainment of the fuel-air mixture by the vortical air flow from the vortex nozzle assists in atomizing the injected fuel and in keeping the reaction components in contact with one another for a maximum length of time. The transverse flow of the fuel and much of the primary air assists in achieving a more uniform temperature pattern at the chamber exit.

Fig. 2 is a modification of a combustion chamber which is shown at 50, comprising two generally coaxial walls, namely, an inner wall or liner 51 and an outer wall or casing 52 held in spaced relation. The liner 51 comprises a closed end section 53 with an arcuate enclosing end 16' defining a portion of the primary air combustion zone therein and a plurality of coaxial cylindrical segments indicated at 54 and 55. Each of the segments 54 and 55 is of slightly greater diameter than the adjacent upstream segment and has an end portion in telescoping relation therewith. The segments are supported in concentric relation by means of outwardly extending flanges 56 and inwardly extending flanges 57.

The segment 54 is preferably provided with two rows of circumferentially spaced axially extending rows of holes 58 through which additional primary combustion air and diluting air passes from the passage 20 to the axially elongated space defined by this segment. Each of the segments 55 is also provided with similar holes 59 through which additional diluting air is admitted. It will be seen that the axial rows of holes 58 and 59 are generally arranged so that the centers of corresponding holes in the respective rows are in a common plane normal to the axis of the chamber.

The free end of the flange 56 may have a series of circumferentially spaced locating tabs (not shown) provided thereon which fit into adjoining slits (not shown) on the flange 57. With this arrangement, the telescoping portions of the liner segments form substantially continuous annular apertures 60 which serve as orifices for forming a film of cooling and insulating air on the inner surface of the next succeeding segments as indicated by the arrows 61 in Fig. 2.

The segment 54 of the liner 51 is partially tapered toward the closed end section 53 as indicated at 62 to define the remainder of the primary air combustion zone therein. The tapered portion 62 of the segment 54 is provided with a series of outwardly extending slots 63 for the admission of additional cooling air. The segments 55 of the liner 51 define an air cooling and air diluting zone therein.

Our invention is well adapted for use in connection with gas turbines. When utilized to drive a turbine wheel, a number of the individual units, as shown in Fig. 1, may be arranged circumferentially around the periphery of the turbine wheel to supply gases throughout the circumference of the wheel. Such an arrangement is illustrated in Fig. 5 wherein 65 indicates a number of combustion units spaced circumferentially and having their discharge ends connected to an anular nozzle box 66 from which gases may be fed through suitable nozzles to a turbine wheel.

Fig. 6 is a modification of a combustion chamber used to provide additional fuel-air mixture which comprises a series of burner assemblies having fuel nozzles and opposed air vortex nozzles mounted adjacent the closed head portion of the liner. Fig. 7 discloses the toroidal combustion pattern of the combustion chamber shown in Fig. 6. A combustion chamber, which is shown at 70, comprises an outer wall 71 and an inner wall 72 having a liner indicated at 73 mounted therebetween and spaced therefrom. The liner 73 has a closed annular end section 74, an arcuate enclosing end 74', an outer wall 75 and an inner wall 76. The outer wall 75 comprises a plurality of coaxial cylindrical segments 77 each of which is of slightly greater diameter than the adjacent upstream segment and has an end portion in telescoping relation therewith. The segments 77 are supported in concentric relation by means of outwardly extending flanges 78 and inwardly extending flanges 79. A plurality of circumferentially spaced apertures 80 are provided along the flanges 79 for the admission of cooling air along the inner surface of the outer wall 75. A plurality of radial slits 81, as best seen in Fig. 8, are equally spaced circumferentially around the free edges of the flanges 79. The slits 81 are provided along the flanges 79 for the purpose of allowing expansion and contraction of each of the segments 77 in both radial and axial directions during operation of the combustion chamber. The free end of the flange 78 may have a series of circumferentially spaced locating tabs (not shown) provided thereon which fit into the adjoining slits 81 on the flange 79. The outer liner wall 75 may be held in spaced relation to the outer wall 71 of the combustion chamber by suitable attaching means, such as, for example, by a number of circumferentially spaced axially extending fins (not shown) which may be welded or otherwise fixed to either the outer liner wall or both the outer liner wall and the outer wall of the combustion chamber. The mounting fins are preferably attached to alternate segments of the outer liner wall 75. With this arrangement, the telescoping portions of the outer liner wall segments 77 form substantially continuous annular apertures 80, which serve as orifices for forming the film of cooling and insulating air on the inner surface of the next succeeding segment, as indicated by the arrows 82, in Fig. 7. Thus, a constant metering of wall cooling air is achieved irrespective of the temperature of each segment.

The inner liner wall 76 comprises a plurality of coaxial cylindrical segments 83 and 84. Each of the segments 83 and 84 is of slightly greater diameter than the adjacent upstream segment and has an end portion in telescoping relation therewith. The segments 83 and 84 are supported in concentric relation by means of outwardly extending flanges 85 and inwardly extending flanges 86. A plurality of circumferentially spaced apertures 87 are provided along the inwardly extending flanges 86 for the admission of cooling air along the inner surface of the inner wall 76 of the liner 73. A plurality of radial slits (not shown), similar to the slits 81, may be equally spaced circumferentially around the free edges of the flanges 86. The free end of flange 85 may have a series of circumferentially spaced locating tabs (not shown) provided thereon which fit into the adjoining slits (not shown) on the flange 86. The inner liner wall 76 may be held in spaced relation to the inner wall 72 of the combustion chamber by suitable attaching means. With this arrangement the telescoping portions of the inner liner wall segments 83 and 84 form substantially continuous annular apertures 87, which serve as orifices for forming the film of cooling and insulating air on the inner surface of the next succeeding segment, as indicated by the arrows 88, in Fig. 7. The segment 83 of the inner liner wall 76 is tapered toward the closed end section 74 and is provided with a series of outwardly extending louvers or slots 89 for the admission of additional cooling air.

A burner assembly is provided with a series of equally spaced inlet apertures 18 which are disposed on the outer surface or side wall of the closed end section 74, as viewed in Fig. 6. Louvers 17 are positioned on the end wall 74' of the closed end section for the admission of cooling air thereto. A series of fuel inlet nozzles 19 are mounted adjacent the closed end section 74 and in alignment with the inlet apertures 18. The number of functioning fuel nozzles at a given time may be varied in accordance with the operating conditions. A deflecting member 21 is provided around each of the inlet openings 18. A series of air vortex nozzles 22 are positioned on the closed end section 74 and in axial alignment with the inlet apertures 18. If desired, alternate burner assemblies may be inverted. The space between the outer wall 75 of the liner 73 and the outer wall 71 of the combustion chamber and the space between the inner wall 76 of the liner 73 and the inner wall 72 of the combustion chamber form passages 90 and 91 to which air is supplied by appropriate means (not shown) at the left end of the combustion chamber as viewed in Fig. 6, at the operating pressure at any particular condition. The pressure will depend on factors, such as, for example, fuel load and altitude. The segments 77 of the outer wall, with the exception of the first liner segment 77, and each segment 84 of the inner wall of the liner 63 are preferably provided with two circumferential rows of holes indicated at 92 through which supplementary combustion air and diluting air pass from the respective passages 90 and 91 to the axially elongated space defined by the liner 73 as indicated by the arrows 93. The first segment 77 adjoining the closed end section 74 is preferably provided with two circumferential rows of holes indicated at 94 through which a portion of the primary combustion air passes from the passage 90 to the axially elongated space defined by the first segment 77 and segment 83 as indicated by the arrows 95.

The mixing and flow pattern of primary air and fuel admitted through the aperture 18 and the mixing and flow pattern of primary air admitted through the air vortex nozzle 22 in Figs. 2 and 7 is similar to the operation of the combustion chamber shown in Fig. 1 and fully described above in connection therewith. Accordingly, the detailed description is not again repeated for Figs. 2 and 7.

In both the embodiment of Fig. 1 and the modifications shown in Figs. 2 and 7, a standard means of ignition, such as, for example, a spark plug may be used, although none is disclosed herein.

As will be apparent to those skilled in the art, the objects of our invention are attained by the injection of a fuel or fuel-air mixture into the hollow core of a vortical air flow, the axis of which is at right angles to the principal combustor axis. This stronger rotating toroidal type of flow at right angles to the combustor axis will result in rapid and complete combustion because of the excellent thermal regeneration obtained. Complete combustion, together with an efficient process for the addition of dilution air, are necessary so that the temperature distribution at the downstream portion will be uniform.

While other modifications of this invention and variations of apparatus that may be employed within the scope of the invention have not been described, the invention is intended to include all such as may be embraced within the following claims.

What we claim as new and desire to secure by Letters Patent of the United States is:

1. A combustion chamber comprising in combination, an outer casing defining an air flow path, an inner liner spaced inwardly of said casing, said liner having an upstream enclosing end, a vortex air nozzle positioned on the side wall of said liner adjacent said closed end, means to admit combustion air to said air nozzle, said vortex air nozzle including a throat section adjacent said liner side wall and in flow communication with the interior thereof, a body section next adjacent said throat section and in air flow communication with the throat section, and a series of turning vanes in said body section to impart a vortical motion to the air for delivery to said throat and the interior of said liner, and a fuel nozzle positioned adjacent said closed end and in opposition to the throat of said vortex air nozzle, to spray fuel into the vortical air flow from said air nozzle.

2. A combustion chamber comprising in combination, a tubular casing defining an air flow path therethrough, a tubular perforated liner within and coaxial with said casing, an arcuate enclosing upstream end on said liner, a vortex air nozzle positioned on the side wall of said liner adjacent the closed end, means to admit combustion air into said nozzle, said vortex air nozzle including a throat section adjacent said side wall of the liner and in flow communication therewith, a body section next adjacent said throat section and in air flow communication with the throat section, and a series of turning vanes in said body section to impart a vortical motion to the combustion air for delivery to said throat and the interior of said liner, said liner having an aperture opposite the throat of the vortex air nozzle, and a fuel nozzle in said casing adjacent said arcuate liner end and in alignment with said aperture to inject a fuel air stream into the liner and the vortical movement of air from said air nozzle.

3. A combustion chamber comprising in combination, an annular casing providing a longitudinal path for the flow of air between the walls thereof, an annular perforated liner within the annular casing and between the walls thereof, the inner surface of said liner having an outwardly tapering surface to provide a narrow annular end section, an arcuate enclosing end on said end section, a plurality of vortical air nozzles positioned circumferentially on the side wall of said end section between the said tapered surface and the said enclosing arcuate end, each of the said vortical nozzles including a throat section adjacent the side wall of said narrow end section and communicating with the interior thereof, a body section next adjacent said throat section and in air flow communication with the casing, and a series of turning vanes in said body portion to impart a vortical motion to the air from said casing for delivery to said throat and the interior of said liner, said end section having an aperture opposite the throat of each air nozzle, and a fuel nozzle adjacent each of said apertures and positioned oppositely of the throat section of said air nozzle to spray a fuel air mixture into the vortical air from said nozzles.

4. A combustion chamber comprising in combination, a tubular casing providing an air flow path, a tubular perforated liner positioned coaxially within said casing, said liner having a tapered surface providing a narrow tubular end section near one end thereof, an arcuate enclosing end on said narrow section, a vortex air nozzle positioned on the side wall of said narrow section between the tapered surface and the arcuate end, said vortex air nozzle including a throat section adjacent said side wall and in communication therewith, a body section next adjacent said throat section and in air flow communication with the casing, and a series of turning vanes in said body portion to impart a vortical motion to the air from said casing for delivery to said throat and the interior of said liner, said end section having an aperture therein opposite the throat of said air nozzle, and a fuel nozzle on said casing and adjacent said arcuate liner end to inject a fuel air stream into the said aperture and the vortical movement of air from said air nozzle.

References Cited in the file of this patent

UNITED STATES PATENTS

| | | |
|---|---|---|
| 1,305,726 | Leonard et al. | June 3, 1919 |
| 1,434,021 | Orr | Oct. 31, 1922 |
| 1,605,403 | Heckeroth | Nov. 2, 1926 |
| 2,286,909 | Goddard | June 16, 1942 |
| 2,404,335 | Whittle | July 16, 1946 |
| 2,422,213 | Smith | June 17, 1947 |
| 2,483,737 | Parrish | Oct. 4, 1949 |
| 2,525,206 | Clarke | Oct. 10, 1950 |
| 2,541,171 | McCarry | Feb. 13, 1951 |
| 2,547,619 | Buckland | Apr. 3, 1951 |
| 2,612,023 | Morrison | Sept. 30, 1952 |
| 2,616,258 | Mock | Nov. 4, 1952 |
| 2,693,676 | Hamm | Nov. 9, 1954 |
| 2,699,648 | Berkey | Jan. 18, 1955 |
| 2,745,250 | Johnson | May 15, 1956 |
| 2,749,706 | Goddard | June 12, 1956 |

FOREIGN PATENTS

| | | |
|---|---|---|
| 14,075 | Great Britain | of 1903 |
| 387,751 | Great Britain | Feb. 16, 1933 |